Figure 1:
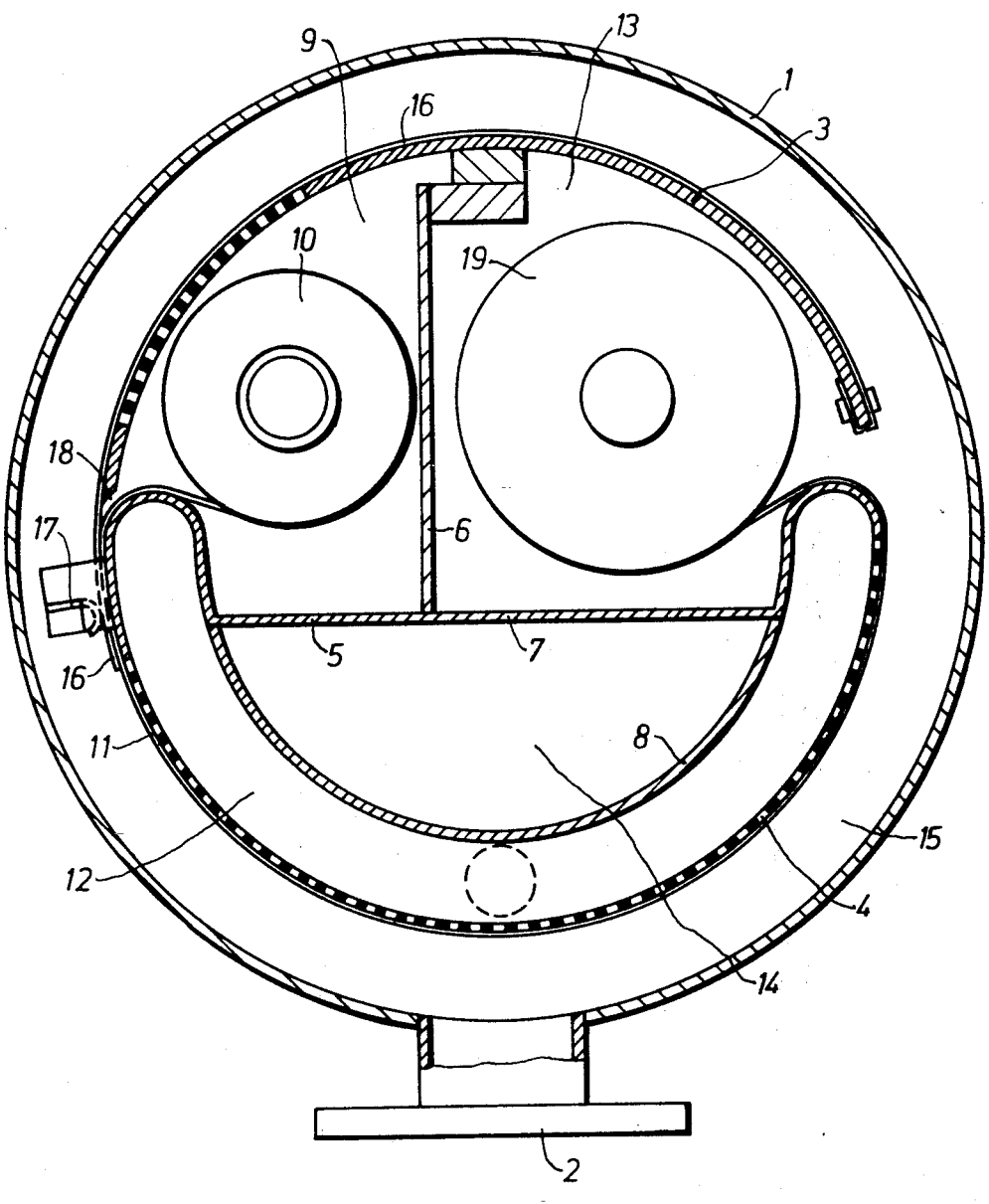

United States Patent [19]

Ruland

[11] 3,979,299

[45] Sept. 7, 1976

[54] PRESSURE FILTER WITH CONTINUOUSLY OR INTERMITTENTLY MOVABLE FILTER CLOTH

[75] Inventor: Dieter Ruland, Monheim-Hitdorf, Germany

[73] Assignee: Bayer Aktiengesellschaft, Leverkusen, Germany

[22] Filed: July 31, 1974

[21] Appl. No.: 493,364

[30] Foreign Application Priority Data

Aug. 1, 1973   Germany............................ 2338911

[52] U.S. Cl. ............................................... 210/387
[51] Int. Cl.² ......................................... B01D 29/02
[58] Field of Search .............................. 210/387, 77

[56] References Cited
UNITED STATES PATENTS

| | | | |
|---|---|---|---|
| 794,631 | 7/1905 | Milne | 210/387 X |
| 1,669,718 | 5/1928 | Manning | 210/387 |
| 1,695,811 | 12/1928 | Manning | 210/387 |
| 2,675,129 | 4/1954 | Doubleday | 210/387 X |
| R24,430 | 2/1958 | Hornbostel | 210/387 |

FOREIGN PATENTS OR APPLICATIONS

| | | | |
|---|---|---|---|
| 656,310 | 5/1929 | France | 210/387 |

*Primary Examiner*—Charles N. Hart
*Assistant Examiner*—Robert H. Spitzer
*Attorney, Agent, or Firm*—Burgess, Dinklage & Sprung

[57] ABSTRACT

The invention relates to an apparatus for filtering fluids comprising a magazine chamber from which the cloth is transported continuously or intermittently over a supporting sieve to a receiving chamber. As the cloth passes through the filtered product with the result that the dimensional changes in the filter cloth due to temperature differences do not come into effect in the filtration section proper.

4 Claims, 1 Drawing Figure

PRESSURE FILTER WITH CONTINUOUSLY OR INTERMITTENTLY MOVABLE FILTER CLOTH

The invention relates to an apparatus for pressure filtering fluids (liquids or gases) through a continuously or intermittently movable filter cloth.

Band filters are known in which the filter cloth is kept in continuous motion, generally in the form of an endless band. When band filters of this kind are used, the filter cake is usually the required product. In cases where the purified filtrate is required as end product, these known band filters cannot be used because the unfiltered product is not sufficiently firmly sealed off against the filtrate and because the filter cloth undergoes dimensional changes when impregnated with the liquid which is to be filtered. In addition, the filter cloth generally carries air into the filtration chamber where it may have undesirable effects, especially in the case of sensitive products.

It is an object of this invention to develop a pressure filter which is so designed that long contact times can be achieved but no particles of gas will be carried into the filtration chamber and the product which is to be filtered is firmly separated from the filtrate by the filter cloth.

According to the invention, there is provided an apparatus for filtering fluids comprising a magazine chamber from which the filter cloth is transported continuously or intermittently over a supporting sieve to a receiving chamber.

The main advantages achieved with this apparatus according to the invention lie in the fact that as the cloth passes through the filtered product it takes on the temperature of the product, which is advantageously the same as the temperature of the product which is to be filtered, with the result that the dimensional changes in the filter cloth due to temperature differences do not come into effect in the filtration section proper. As the filter cloth becomes soaked with filtered product, the particles of gas caught in the filter cloth are expelled.

According to a particularly advantageous embodiment of the apparatus of the invention, a magazine chamber which is separated from the unfiltered product by a magazine filter cloth contains a rotatably mounted magazine roll from which the filter cloth is unwound and passed through a slot which is sealed off by the magazine cloth and over a curved supporting sieve which forms the covering to a filter chamber and on to a rotatably mounted winding roll in the receiving chamber.

The particular advantages achieved by this arrangement is that the filter cloth on the magazine roll is immersed in the filtered product which is constantly replaced by fresh filtered product automatically flowing into the magazine chamber as it is used up. Since the filtered product in the magazine chamber is very close to the still unfiltered product, the filtered and unfiltered product are both at the same temperature so that in the filtration zone proper of the filter chamber there are no disadvantageous dimensional changes in the filter cloth.

It is advantageous, particularly in the case of filtering volatile liquids, if the magazine chamber and winding chamber are both arranged inside a housing.

According to another feature of the apparatus according to the invention, the magazine cloth overlaps the slot and is firmly pressed into position by a spring mounted sealing lip in order to ensure that no unfiltered product can enter the magazine chamber.

The supporting sieve can withstand high static loads if it is in the form of a perforated metal sheet with the edges free from perforations. In this case, a very efficient seal may be obtained by providing sealing profils on the unperforated edges.

In the case of delicate filter cloths which cannot withstand friction over the belt sections, the profils are arranged to be displaceable according to another feature of the invention, for example they may be in the form of endless belts.

In another advantageous embodiment of the apparatus according to the invention, the magazine roll and winding roll are equipped with brakes and locks in order to ensure that the filter cloth will fit snugly over the supporting sieve and thus provide an effective seal.

An embodiment of the apparatus according to the invention is represented in the drawing by way of example as described below. In the drawing, FIG. 1 is a cross-section through an embodiment of an apparatus according to the invention.

The filter consists of a cylindrical housing 1 having a fixed base and pipe connection 2 for filling the filter. Inserted in the housing is a filter insert which consists of a cylindrical metal jacket in two parts 3, 4 which is partly perforated except for the marginal zones and also has a fixed base. When the filter is put into operation, the product which is to be filtered is in front of the filter insert. The interior of the filter insert is subdivided into four chambers 9, 12, 13 and 14 by partitions 5, 6, 7 and 8. The first chamber or magazine chamber 9 formed by the partitions 5 and 6 and metal jacket 3 contains a magazine roll 10 from which a filter cloth 11 is removed as required. The filter cloth 10 passes through slot 18 formed between the elements 3, 4 of the filter insert. The second chamber is the filter chamber 12 formed by the jacket 4 and partition 8, from which the required product, i.e. the filtrate which has passed through the filter cloth 11 and perforated jacket 4, is removed through a pipe. In the winding chamber 13, formed by the partitions 6 and 7, and the jacket 3, the used filter cloth 11 which has passed over the perforated jacket 4 of the filter chamber 12 is rolled up on to take up means in the form of roller 19. The fourth chamber 14 serves as a displacement chamber to keep the chambers 9, 12 and 13 as small as possible. It may also serve as temperature control chamber for heating or cooling the contents of the filter. The chamber formed by the housing 1 and filter insert 3 4, hereinafter referred to as pressure chamber 15, is connected to the filter inflow by the pipe connection 2. The jacket 3 is removable and while the apparatus is in operation it is covered by a magazine chamber cloth 16 which consists of a filter cloth which partly overlaps the filter cloth 11 drawn from the magazine roll 10. A sealing lip 17 presses the overlapping magazine cloth 16 against the filter cloth 11 fed from the magazine chamber 9. The pressure chamber 15, magazine chamber 9 and winding chamber 13 are all at the same pressure $P_1$. A pressure gradient $P_1 - P_2$ becomes established between the pressure chamber 15 and filter chamber 12. This gradient increases as the filter cloth 11 becomes progressively more soiled. The filter cloth 11 and magazine cloth 16 cover the jackets 3,4 over their whole width. If required, the filter cloth 11 may be pressed down at the edges by two circumferential ring sections.

What we claim is:

1. Apparatus for filtering fluids with a filter cloth wherein the filter cloth is subjected to transport continuously or intermittently over a supporting sieve plate, which comprises:
   a. a housing, means mounted in the housing providing therein a pressure chamber for receiving the unfiltered fluid and a filtrate chamber for the filtered fluid, said means comprising said supporting sieve plate for passage therethrough of fluid from the pressure chamber to the filtrate chamber,
   b. means within the housing defining a magazine chamber for holding and supplying the filter cloth for said transport over the supporting sieve,
   c. means for taking up the filter cloth after the transport thereof over the supporting sieve,
   d. filtering means communicating the pressure chamber and the magazine chamber for introduction of filtrate into the magazine chamber for immersion of the filter cloth in the magazine chamber in filtrate before transport of the filter cloth over the supporting sieve, and
   e. means defining a slot between the magazine chamber and the pressure chamber for passage of the filter cloth from the magazine chamber to the pressure chamber, and means for sealing the slot for preventing passage of unfiltered fluid into the magazine chamber.

2. Apparatus according to claim 1, said filtering means of the magazine chamber comprising a second filter cloth, the second filter cloth extending over the slot and onto said sieve plate and said sealing means pressing said extension of the second filter cloth against the sieve plate providing said seal between the pressure chamber and the magazine chamber.

3. Apparatus according to claim 2, wherein the take up means is disposed within the housing.

4. Apparatus according to claim 1, wherein the take up means is disposed within the housing.

* * * * *